United States Patent [19]

Boszor et al.

[11] Patent Number: 5,605,441

[45] Date of Patent: *Feb. 25, 1997

[54] COMPRESSOR BLADE CONTAINMENT WITH COMPOSITE STATOR VANES

[75] Inventors: Samuel M. Boszor; Stuart A. Sanders, both of Palm Beach Gardens, Fla.

[73] Assignee: United Technologies Corporation, Hartford, Conn.

[ * ] Notice: The term of this patent shall not extend beyond the expiration date of Pat. No. 5,509,781.

[21] Appl. No.: 559,502

[22] Filed: Nov. 15, 1995

Related U.S. Application Data

[62] Division of Ser. No. 194,200, Feb. 9, 1994, Pat. No. 5,509,781.

[51] Int. Cl.$^6$ .................................................. F01D 9/04
[52] U.S. Cl. ................ 415/200; 29/889.71; 416/229 A; 416/230; 416/241 A
[58] Field of Search .................. 415/200; 416/224, 416/229 A, 230, 241 A; 29/889.71; 428/292, 373, 374, 408, 902, 911

[56] References Cited

U.S. PATENT DOCUMENTS

| 5,439,353 | 8/1995 | Cook et al. | 416/230 |
| 5,509,781 | 4/1996 | Boszor et al. | 415/200 |

Primary Examiner—Edward K. Look
Assistant Examiner—Christopher Verdier
Attorney, Agent, or Firm—Robert E. Greenstien

[57] ABSTRACT

Stator vanes located between compressor stages in a gas turbine engine are fabricated with a composite outer shell made of graphite fibers in an epoxy binder that is laid-up over a core of felt-like material selected to have an elongation velocity that is greater than the elongation velocity of the shell.

4 Claims, 3 Drawing Sheets

COMPRESSOR BLADE CONTAINMENT WITH COMPOSITE STATOR VANES

This application is a divisional of U.S. patent application Ser. No. 08/194,200 filed on Feb. 9, 1994, now U.S. Pat. No. 5,509,781.

TECHNICAL FIELD

This invention relates to gas turbine engines, in particular, compressor blade containment using composite stator vanes.

BACKGROUND OF THE INVENTION

Compressor blades in a gas turbine engine can fail, breaking into high velocity projectiles that can damage surrounding engine components. A similar problem with fan blades has been addressed by constructing the fan duct of a composite material.

Stator vanes are employed in gas turbine engines to control the aerodynamic characteristics of compressor blades. The vanes are placed between compressor stages. A typical stator vane is constructed of an alloy, When the vane is struck by a compressor blade fragment, the fragment either ricochets off the vane or fractures the stator blade. Either outcome compounds the problem, possibly subjecting the engine to serious damage. Some stator vanes are constructed completely of a composite material comprising non-metallic fibers in a resin binder. When the vane is intended to rotate, a metal core may be included, giving the vane improved torsional stiffness.

It is known that certain light, low density materials are better suited than other materials, some high density, to stop high velocity objects without being penetrated. The material has the quality to elongate rather than break. This quality is governed by the material's ultimate elongation velocity:

$$\text{Elongation velocity} = \frac{\text{Strength}}{\sqrt{\rho \cdot E}} \quad \text{Equation 1}$$

where $\rho$ is density and $E$ is Young's modulus. In fact, this quality is a primary reason that composite materials such as graphite and epoxy-are used on fan ducts or shrouds.

SUMMARY OF THE INVENTION

An object of the present invention is to employ the stator vanes to contain compressor blade fragments.

An object of the present invention is to construct a light, temperature resistant composite stator vane in a way that is especially suitable for absorbing these fragments without failing.

According to the present invention, a stator vane is fabricated with a composite outer layer, for instance carbon filaments in an epoxy binder, over a core made of fibrous material having an elongation velocity that is greater than the ultimate elongation velocity of the composite material used in the outer layer.

According to one aspect of the invention, a stator vane is fabricated with a composite outer layer, for instance, carbon filaments in an epoxy or polyimide binder over a core made from random or woven fibers, such as T1000.

According to one aspect of the invention, the core comprises fibers in a random pattern.

According to one aspect of the invention, a mat with fibers in a felt configuration with a specific minimum aspect ratio (fiber length to diameter) is used for the core.

According to one aspect of the invention, the aspect ratio is at least ten to one.

According to one aspect of the invention, the mat material is selected to have an elongation velocity at least twice that of the outer layer.

The invention provides a stator vane construction with the improved lightness provided by composites plus enhanced capacity to absorb fragments from damaged compressor blades. Other objects, benefits and features of the invention will be apparent to one of ordinary skill in the art from the following discussion of the invention, wherein:

DESCRIPTION OF THE PREFERRED EMBODIMENT

Figure 1:
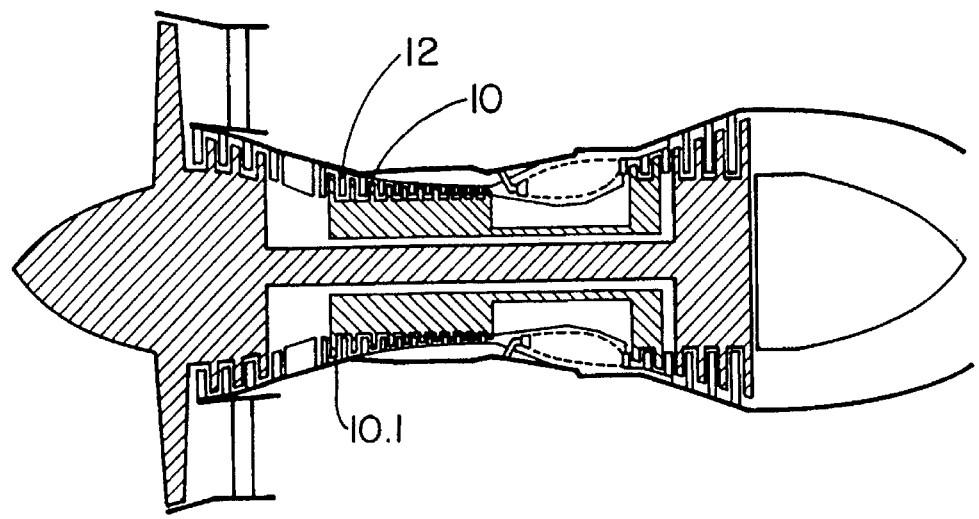
FIG. 1 is a simplified sectional view of a typical bypass gas turbine engine in which the invention may be employed.

FIG. 1 shows a greatly simplified bypass gas turbine engine 10, the type used on aircraft, for which the invention is especially useful. In connection with the invention, pertinent features are the compressor stage 10.1 and the stator vanes 12. The vanes 12 are located between the stages. Though not shown, it should be recalled that each stage comprises a rotor disk with a plurality of attached compressor blades. Usually, vane deflection angle relative to the compressor blades can be adjusted to regulate air flow to the blades to control any one of a number of engine operating characteristics. From FIG. 1, it can be realized that if a compressor blade fails, discharging metal fragments, many of the fragments will strike the stator vanes on each side of the blade. The vanes are designed, according to the present, invention, to absorb the fragments, but not fail.

Figure 2:
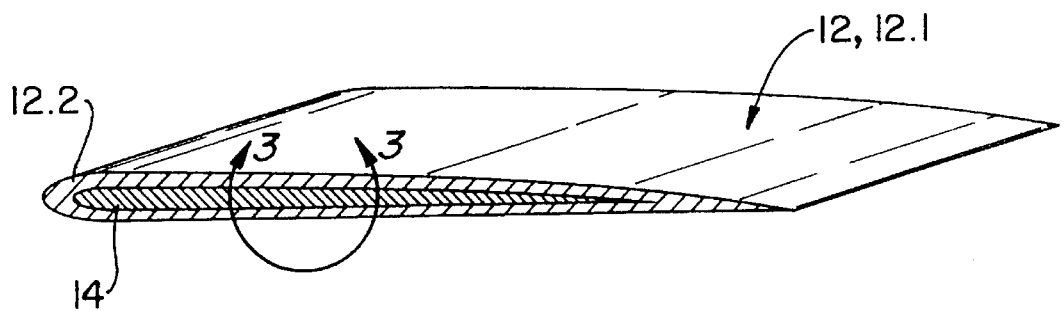
FIG. 2 is a perspective section of a typical stator vane embodying the present invention.
Figure 3:
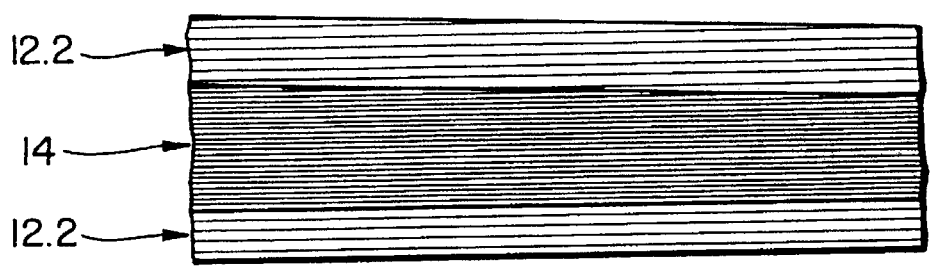
FIG. 3 is an enlargement of a portion of FIG. 2.

One of the stator vanes 12 is shown at 12.1 in. FIG. 2. The vane is a composite structure, having a shell 12.2 consisting of graphite fibers in a polymer binder, a construction that is well known. The shell is laid-up over a core 14 made of felt-like material made with a suitable high elongation velocity fiber, for instance fiber of T1000 material, available under the Thornel brand from Amoco. In this case it has been found preferable to have fibers in the core with a length that is at least ten times their diameter (aspect ratio of 10).

Figure 4:
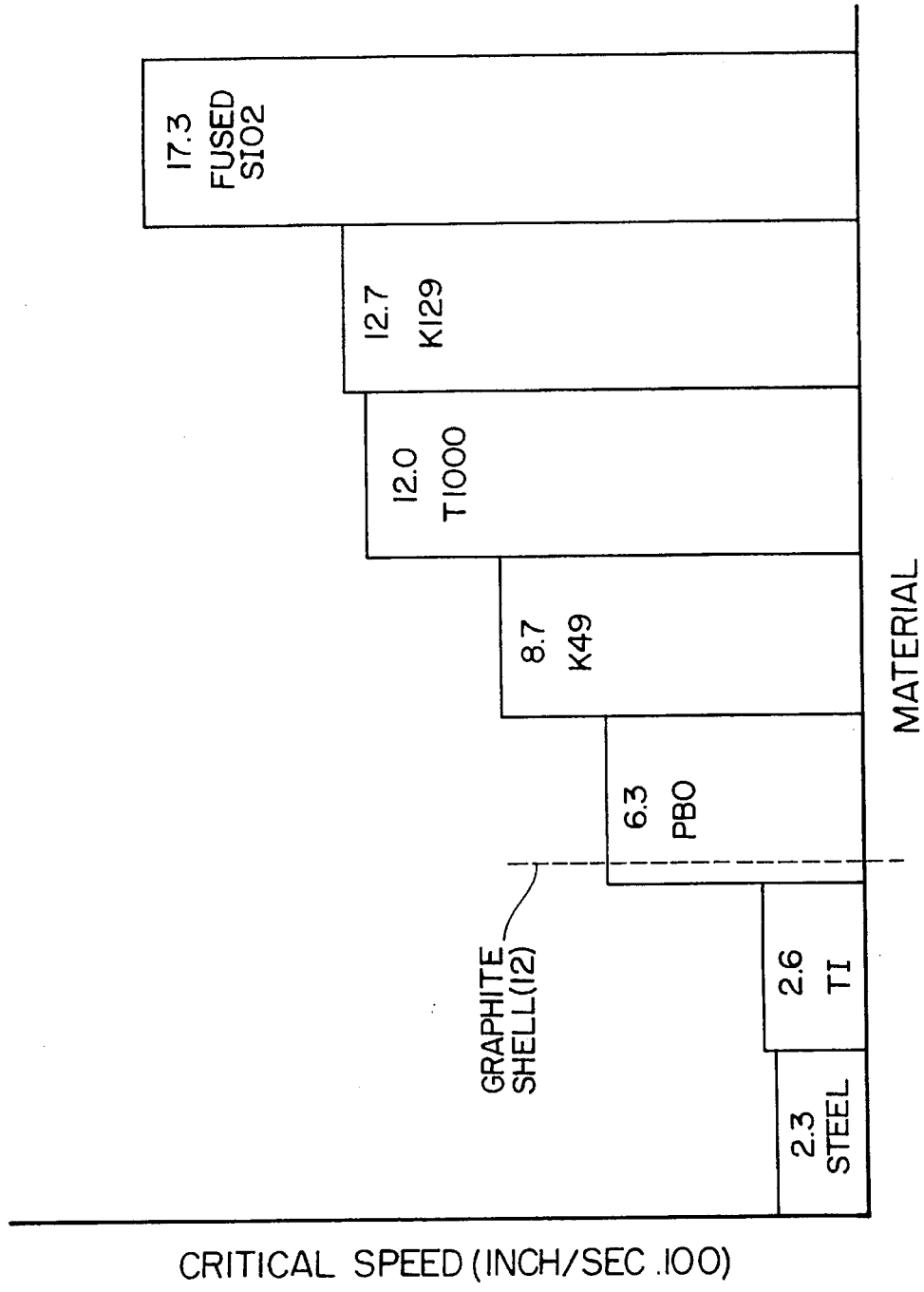
FIG. 4 is a chart showing the relative ultimate elongational velocities of different materials, including materials used in a stator vane embodying the present invention.

FIG. 4 shows the relative ultimate elongation velocities $(V_c)$ of different materials. Steel has a value of 2.3, meaning 2300 inches per second. Ti stands for titanium, PBO is poly-para-phenylene-benzo-bis-oxazole. K49 and K129 are known different types of Kevlar brand polyaramid fiber. Fused silicon dioxide is shown as $SiO_2$. The value for the shell material 12 (graphite fibers), is about 5. According to the invention, T1000 brand fibers (or their equivalent) are selected because, in the felt mat they have been found to have an elongation velocity that is twice that of the composite outer surface. T1000 is particularly appropriate for gas turbine engines because it can tolerate the high temperatures to which the vane may be subjected at different compressor stages.

Figure 5:
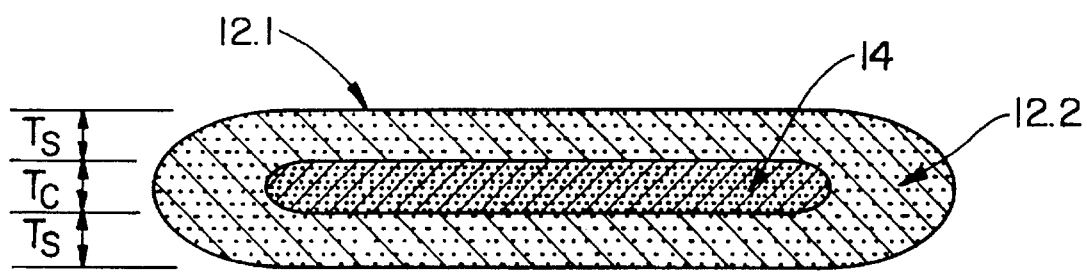
FIG. 5 is a cross-section of a symmetrical vane embodying the present invention.

The following examples of different configurations are referenced to FIG. 5, where $T_s$ is the thickness of the outer surface or the vane "shell" 12; $T_c$ is maximum cross-sectional thickness of the core 14; and $V_c$ is the elongation velocity from equation 1.

Example 1:

Shell construction of eight plies of Gr (Graphite)/epoxy resin, uniweave fabric, $T_s$ of 0.054 inches, $V_c$ equals 4.2. Core construction, four plies of K129/Epoxy (8HS fabric), $T_c$ of 0.050 inches, $V_c$ equals 7.6.

Example 2:

Shell construction of four plies of Gr/polyimide resin (8HS Fabric), $T_s$ equals 0.050 inches; $V_c$ equals 3.5. Core construction of four plies of T1000/polyimide resin, 8HS fabric, $T_s$ equals 0.050 inches, $V_c$ equals 6.0.

Example 3:

Shell construction of eight plies of Gr/polyimide resin, uniweave fabric, $T_s$ equals 0.054 inches, $V_c$ equals 4.2. Core construction, one ply polyimide film ($T_c$ of 0.002 inches) on either side of four plies of fused $SiO_2$/polyimide foam ($T_c$ of 0.050 inches), giving the core a $V_c$ of 8.7. (In this example, polyimide foam consists of a polyimide resin filled with hollow microspheres having compressive strengths greater than 500 psi).

With the benefit of the foregoing explanation of the invention, one skilled in the art may develop modifications to the invention, in whole or in part, without departing from the true scope and spirit of the invention.

We claim:

1. A gas turbine engine comprising stator vanes located between compressor stages, characterized by:

the stator vanes including a composite shell of fibers laid-up over a core, said fibers comprising a plurality of plies of graphite fibers in a binder bonded to said core, said core comprising randomly oriented fibers selected to have an elongation velocity that exceeds the elongation velocity of said fibers in said composite shell.

2. A gas turbine as described in claim 1, further characterized by:

said core comprising at least four plies of K129 in an epoxy binder; and said shell comprising at least eight plies of graphite fibers in an epoxy binder.

3. A gas turbine engine according to claim 1, further characterized by:

said core comprising one ply of polyimide film over at least four plies of fused $SiO_2$ in polyimide foam comprising polyimide resin filled with hollow microspheres having compressive strengths greater than a selected value.

4. A stator vane as described in claim 3, further characterized in that the selected value is 500 psi.

* * * * *